(12) United States Patent
Egawa

(10) Patent No.: US 8,462,237 B2
(45) Date of Patent: Jun. 11, 2013

(54) SOLID-STATE IMAGE PICKUP DEVICE WHICH SENSES AND PROCESSES LIGHT INTO PRIMARY COLOR BANDS AND AN ALL WAVELENGTH BAND

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 753 days.

(21) Appl. No.: 12/616,391

(22) Filed: Nov. 11, 2009

(65) Prior Publication Data

US 2010/0123809 A1 May 20, 2010

(30) Foreign Application Priority Data

Nov. 14, 2008 (JP) ................................. 2008-292237

(51) Int. Cl.
*H04N 5/208* (2006.01)
*H04N 9/083* (2006.01)

(52) U.S. Cl.
USPC ........ 348/252; 348/222.1; 348/276; 348/277; 382/266

(58) Field of Classification Search
None
See application file for complete search history.

(56) References Cited

U.S. PATENT DOCUMENTS

| | | | |
|---|---|---|---|
| 5,748,371 A | 5/1998 | Cathey, Jr. et al. | |
| 5,909,312 A | 6/1999 | Mendlovic et al. | |
| 6,148,116 A * | 11/2000 | Park et al. | 382/266 |
| 6,343,307 B1 | 1/2002 | Mendlovic et al. | |
| 6,373,992 B1 | 4/2002 | Nagao | |
| 6,388,706 B1 | 5/2002 | Takizawa et al. | |
| 6,714,688 B1 * | 3/2004 | Gallagher et al. | 382/266 |
| 6,842,297 B2 | 1/2005 | Dowski, Jr. | |
| 7,003,177 B1 | 2/2006 | Mendlovic et al. | |
| 7,065,256 B2 | 6/2006 | Alon | |
| 7,148,924 B2 * | 12/2006 | Hiroshige et al. | 348/252 |
| 7,812,971 B2 * | 10/2010 | Jackson et al. | 356/614 |
| 7,889,252 B2 * | 2/2011 | Tamura et al. | 348/272 |
| 2008/0291312 A1 | 11/2008 | Egawa | |
| 2008/0303919 A1 | 12/2008 | Egawa | |

FOREIGN PATENT DOCUMENTS

| | | |
|---|---|---|
| CN | 1668067 A | 9/2005 |
| CN | 101247529 A | 8/2008 |
| EP | 1 662 803 A1 | 5/2006 |
| JP | 62-115408 | 5/1987 |
| JP | 2003-16425 | 1/2003 |
| JP | 2005-143038 | 6/2005 |
| JP | 2007-318233 | 12/2007 |

(Continued)

OTHER PUBLICATIONS

Japanese Office Action issued May 8, 2012, in Japan Patent Application No. 2008-292237 (with English translation).

(Continued)

*Primary Examiner* — Ngoc-Yen Vu
(74) *Attorney, Agent, or Firm* — Oblon, Spivak, McClelland, Maier & Neustadt, L.L.P.

(57) ABSTRACT

The solid-state image pickup device includes a sensor unit and a focus adjustment circuit, the focus adjustment circuit including a contour extraction circuit which extracts contour signals from wavelength signals W, B, G, and R, a contour signal selection circuit which receives a control signal and the plurality of contour signals extracted by the contour extraction circuit, and selects and outputs a contour signal having a desired wavelength band in accordance with the control signal, and a plurality of addition circuits which add the wavelength signals before the contour signals are extracted by the contour extraction circuit to a contour signal output from a contour signal output circuit.

17 Claims, 15 Drawing Sheets

FOREIGN PATENT DOCUMENTS

| KR | 10 2008 00962 | 10/2008 |
| WO | WO 2005/018236 A1 | 2/2005 |
| WO | WO 2006/077344 A2 | 7/2006 |
| WO | WO 2006/095110 A2 | 9/2006 |

OTHER PUBLICATIONS

Office Action issued Jun. 19, 2012, in Chinese Patent Application No. 200910222055.6.

Combined Taiwanese Office Action and Search Report issued Dec. 18, 2012 in Taiwanese Patent Application No. 098137146 (with English Translation of Categories of Cited Documents).

Office Action issued on Jul. 29, 2011 in the corresponding Korean Application No. 200910222055.6 (with English Translation).

* cited by examiner

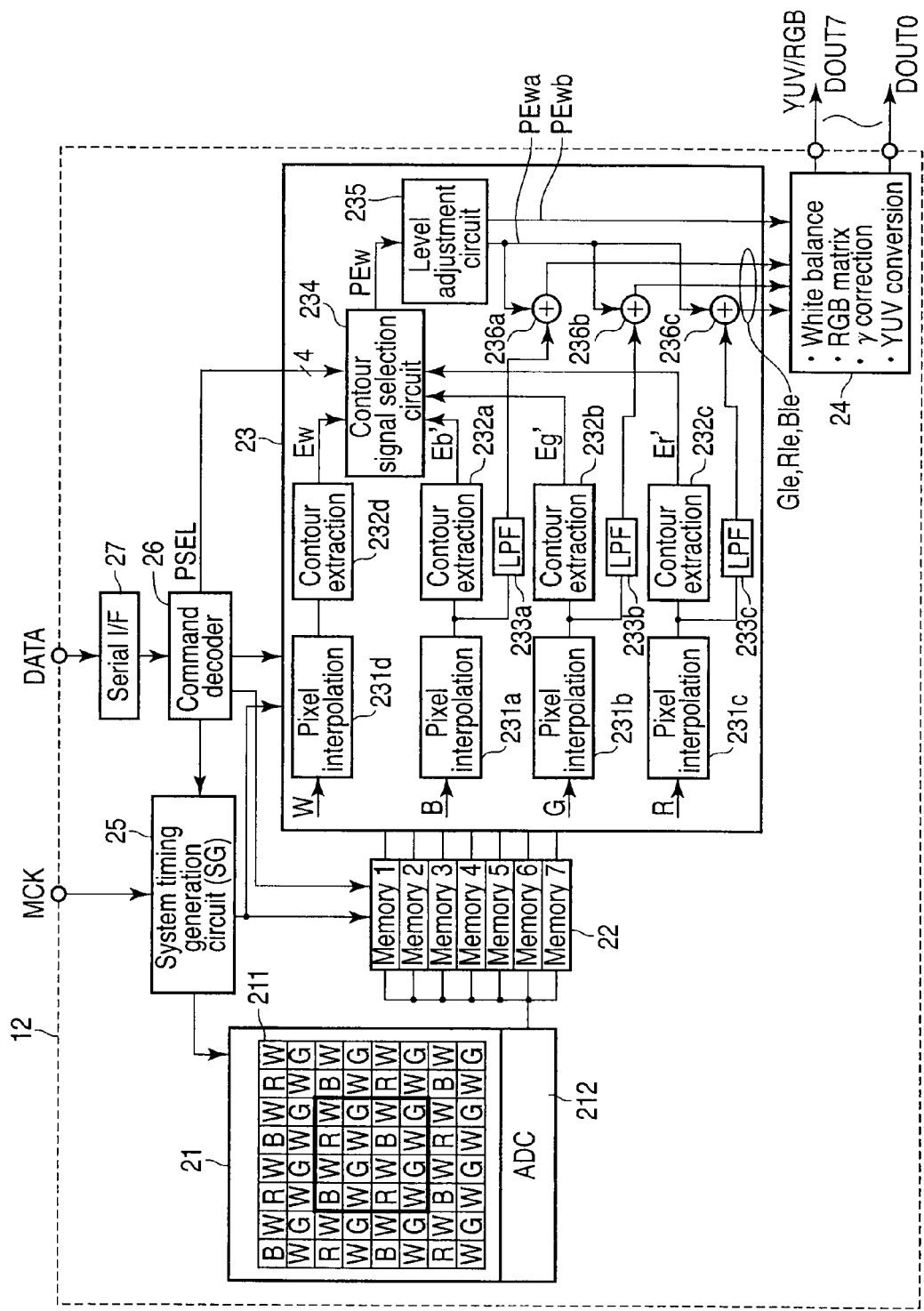
F I G. 1

FIG. 5A

| W | W1 | W | W2 | W |
|---|---|---|---|---|
| W3 | W | W4 | W | W5 |
| W | W6 | W | W7 | W |
| W8 | W | W9 | W | W10 |
| W | W11 | W | W12 | W |

\*

| -1 | -1 | -1 |
|---|---|---|
| -1 | 8 | -1 |
| -1 | -1 | -1 |

| W | W1 | W | W2 | W |
|---|---|---|---|---|
| W3 | W | W4 | W | W5 |
| W | W6 | W | W7 | W |
| W8 | W | W9 | W | W10 |
| W | W11 | W | W12 | W |

\*

| -1 |  | -1 |
|---|---|---|
|  | 4 |  |
| -1 |  | -1 |

| W | W1 | W | W2 | W |
|---|---|---|---|---|
| W3 | W | W4 | W | W5 |
| W | W6 | W | W7 | W |
| W8 | W | W9 | W | W10 |
| W | W11 | W | W12 | W |

\*

| -1 | -1 | -1 | -1 | -1 |
|---|---|---|---|---|
| -1 | -2 | -2 | -2 | -1 |
| -1 | -2 | 32 | -2 | -1 |
| -1 | -2 | -2 | -2 | -1 |
| -1 | -1 | -1 | -1 | -1 |

= Ew

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

\* 1 / 256

F I G. 6

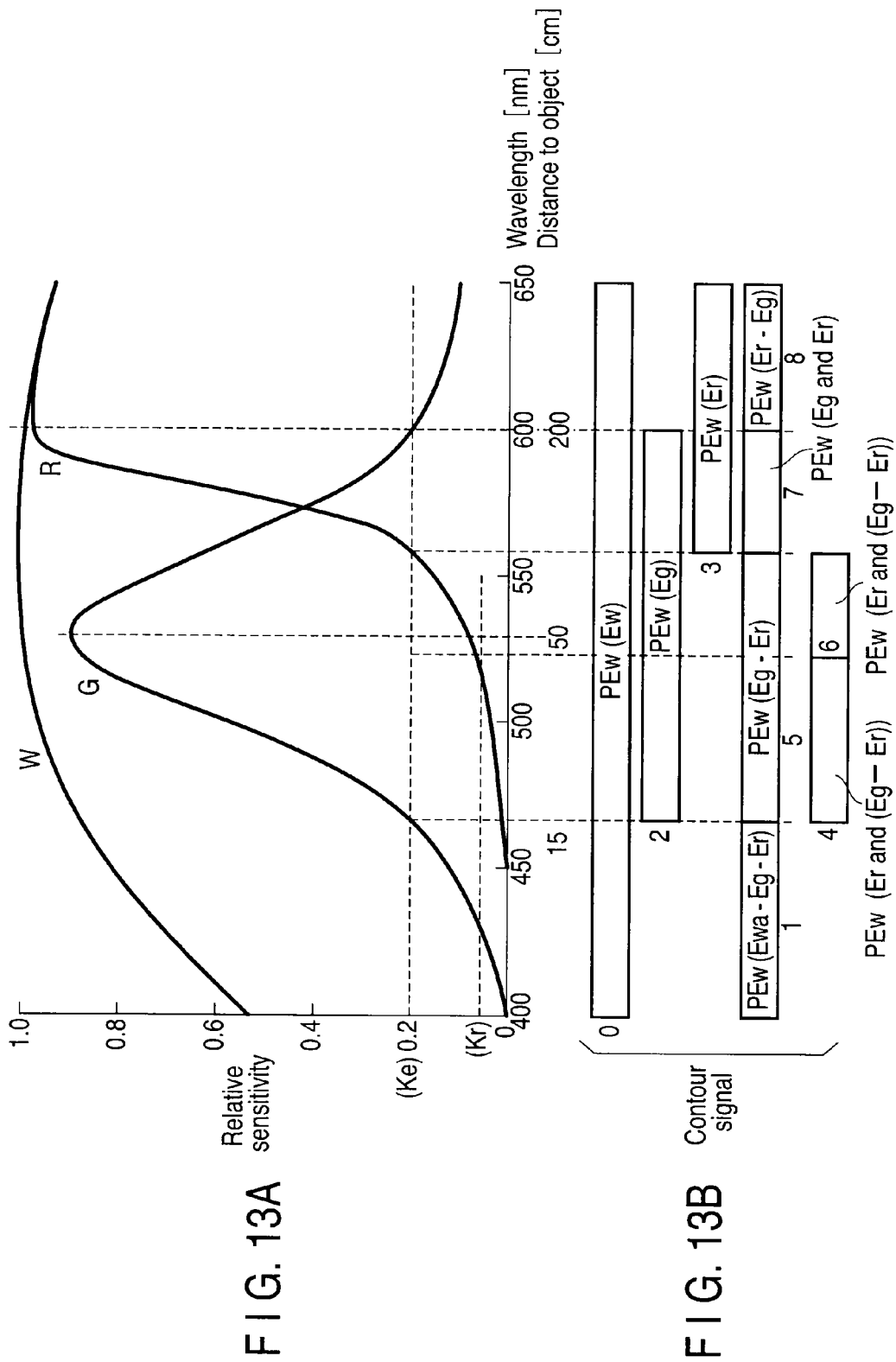
F I G. 13A
F I G. 13B

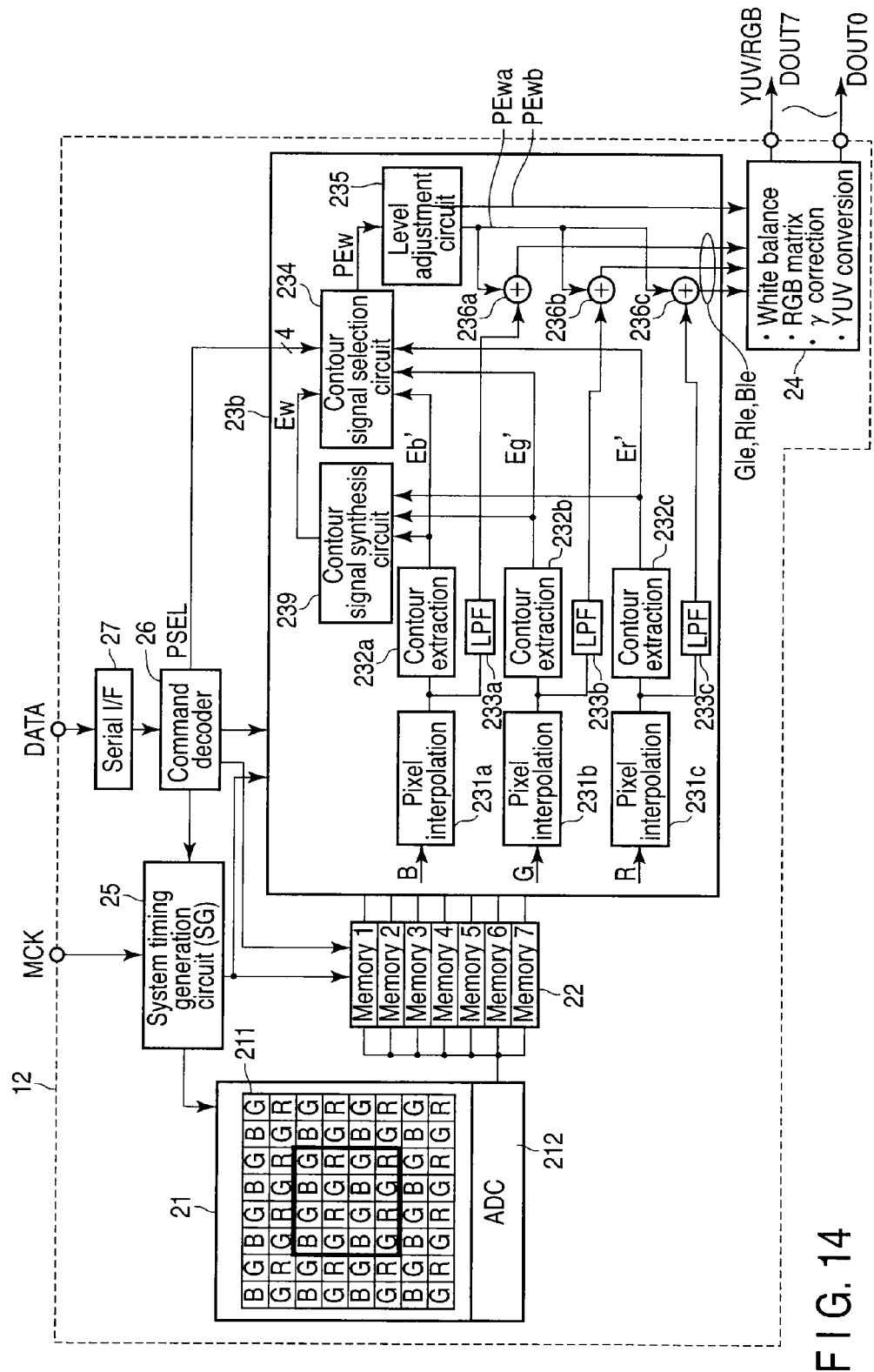
F I G. 14

SOLID-STATE IMAGE PICKUP DEVICE WHICH SENSES AND PROCESSES LIGHT INTO PRIMARY COLOR BANDS AND AN ALL WAVELENGTH BAND

CROSS-REFERENCE TO RELATED APPLICATIONS

This application is based upon and claims the benefit of priority from prior Japanese Patent Application No. 2008-292237, filed Nov. 14, 2008, the entire contents of which are incorporated herein by reference.

BACKGROUND OF THE INVENTION

1. Field of the Invention

The present invention relates to a solid-state image pickup device having a built-in processing circuit such as an image sensor that processes an image signal, and it is used for, e.g., a mobile phone equipped with an image sensor, a digital camera, or a video camera.

2. Description of the Related Art

A reduction in size of a camera module for a mobile phone has been strongly demanded with a reduction in width of a mobile phone. Additionally, a camera module for a mobile phone, which is hardly destroyed even if it is dropped, has been demanded. Further, in recent years, an increase in the number of pixels, e.g., 5 mega pixels or more or 8 mega pixels or more has advanced to fulfill the demand for an improvement in image quality. In a multi-pixel sensor, a depth of field becomes shallow with a reduction in a pixel size. Therefore, an autofocus (AF) mechanism is required, and hence reducing a size of a module is difficult, and there is also problem that the module is prone to breakage when it is dropped. Each of Alon et al. (U.S. Pat. No. 7,065,256), Mendlovic et al. (U.S. Pat. No. 5,909,312), and Mendlovic et al. (U.S. Pat. No. 6,343,307) discloses a solid-state image pickup device that deepens a depth of field. However, a countermeasure for a problem of the chromatic aberration in a lens is not provided, a problem of occurrence of a false color in an image arises, or a resolution signal is not sufficiently obtained, and hence a color reproduced image having a sufficient resolution or a high quality is not acquired.

BRIEF SUMMARY OF THE INVENTION

According to a first aspect of the present invention, there is provided a solid-state image pickup device comprising:

a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into at least 2 or more wavelength components to generate electrical wavelength signals; and a signal processing circuit which processes the at least 2 wavelength signals generated by the sensor unit, wherein the signal processing circuit includes:

a plurality of contour signal extraction circuits which receive the at least 2 wavelength signals to extract respective contour signals; and a contour signal selection circuit which receives a control signal and the plurality of contour signals extracted by the plurality of contour signal extraction circuits, and selects and outputs a contour signal having a desired wavelength band in accordance with the control signal.

According to a second aspect of the present invention, there is provided a solid-state image pickup device comprising:

a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into 3 wavelength components, i.e., a first color wavelength band and a second color wavelength band using 2 out of a blue wavelength band, a green wavelength band, and a red wavelength band, and all wavelength bands to generate electrical wavelength signals; and a signal processing circuit which processes the 3 wavelength signals generated by the sensor unit, wherein the signal processing circuit includes:

a wavelength signal generation circuit which receives the 3 wavelength signals having the all wavelength bands, the first color wavelength band, and the second color wavelength band to generate a wavelength signal having a third color wavelength band;

a plurality of contour signal extraction circuits which receive the 3 wavelength signals having the all wavelength bands, the first color wavelength band, and the second wavelength band to extract contour signals, respectively; and a contour signal selection circuit which receives a control signal and the plurality of contour signals extracted by the plurality of contour signal extraction circuits, and selects and outputs a contour signal having a desired wavelength band in accordance with the control signal.

According to a third aspect of the present invention, there is provided a solid-state image pickup device comprising:

a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into 3 wavelength components having a blue wavelength band, a green wavelength band, and a red wavelength band to generate electrical wavelength signals; and a signal processing circuit which processes the 3 wavelength signals generated by the sensor unit, wherein the signal processing circuit includes:

first to third contour signal extraction circuits which receive the three wavelength signals having the blue wavelength band, the green wavelength band, and the red wavelength band to extract first to third contour signals;

a contour signal synthesis circuit which receives the first to third contour signals and synthesizes a contour signal of a wavelength signal having all wavelength bands to be output as a fourth contour signal; and a contour signal selection circuit which receives a control signal, the fourth contour signal, and the first to third contour signals, and selects and outputs a contour signal having a desired wavelength band in accordance with the control signal.

BRIEF DESCRIPTION OF THE SEVERAL VIEWS OF THE DRAWING

FIG. 1 is a block diagram showing a circuit configuration of a sensor chip used in a solid-state image pickup device according to a first embodiment;

FIGS. 5A to 5C are views showing how contours of transparent pixels are extracted in a plurality of contour extraction circuits in FIG. 1 to generate contour signals;

FIG. 6 is a view showing how high-frequency removal processing for signals is executed in a plurality of LPF circuits in FIG. 1;

FIGS. 13A and 13B are a characteristic view showing spectral sensitivity characteristics of the solid-state image pickup device according to the second embodiment and a characteristic view showing an output result of a contour signal in the contour signal selection circuit in FIG. 12A;

FIG. 14 is a block diagram showing a circuit configuration of a sensor chip used in a solid-state image pickup device according to a third embodiment;

DETAILED DESCRIPTION OF THE INVENTION

Figure 2:
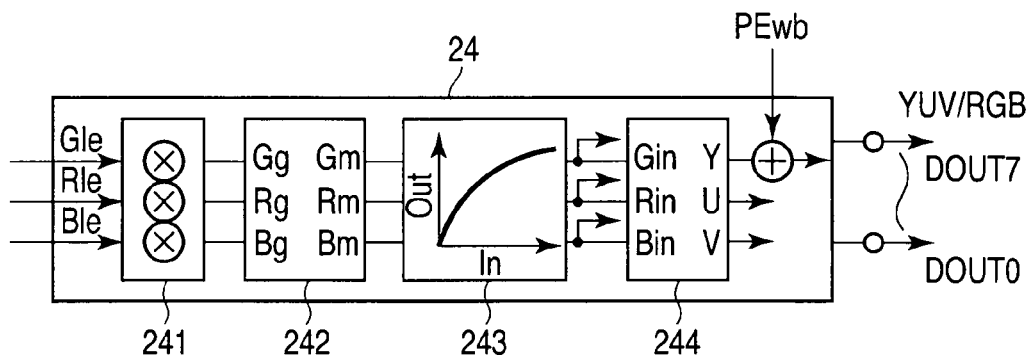
FIG. 2 is a block diagram showing an example of a configuration of a downstream signal processing circuit in FIG. 1.

Embodiments according to the present invention will now be described hereinafter with reference to the accompanying drawings. It is to be noted that like reference numerals denote like parts in a description of the embodiments, thereby omitting a tautological explanation.

First Embodiment

Figure 3:
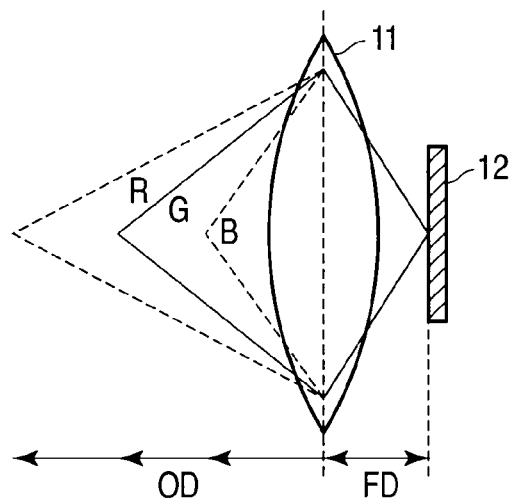
FIG. 3 is a block diagram showing an optical lens and a sensor chip in the solid-state image pickup device according to the first embodiment.
Figures 4A, 4B, 4C, 4D:
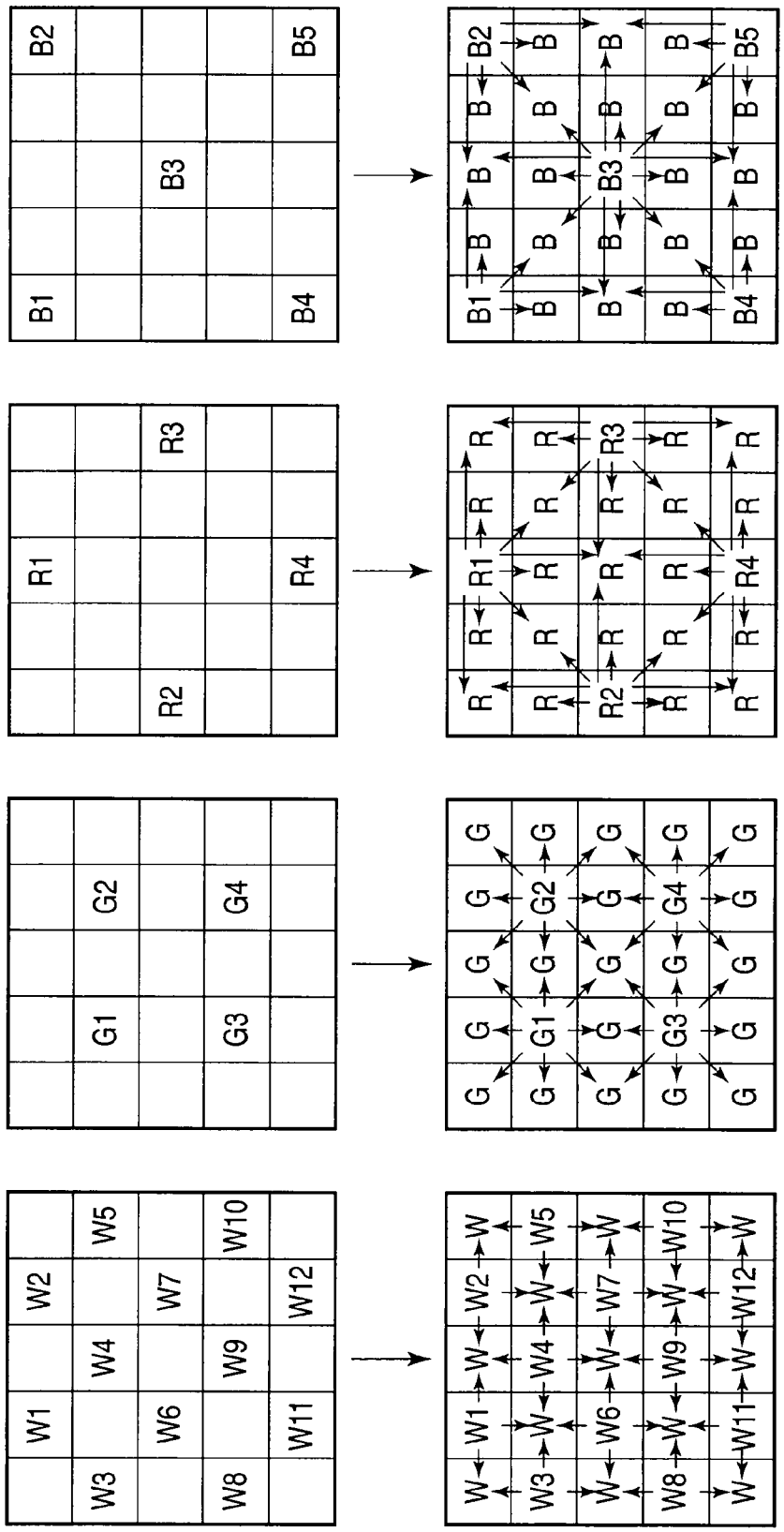
FIGS. 4A to 4D are views showing how interpolation processing of signals of a transparent pixel, a blue pixel, a green pixel, and a red pixel is performed in pixel interpolation circuits depicted in FIG. 1.

FIG. 1 is a view showing a schematic configuration of a solid-state image pickup device using a CMOS image sensor according to a first embodiment. This solid-state image pickup device is formed of a sensor chip 12 that converts a signal of light condensed by an optical lens 11 depicted in FIG. 3 into an electrical signal and outputs a digital image signal. Although described later in detail, a chromatic aberration lens having characteristics that a focal position differs depending on wavelengths in respective bands of R (red), G (green), and B (blue) is used as the optical lens 11. In FIG. 3, FD denotes a focal distance, and OD designates a distance to an object.

FIG. 1 shows a circuit configuration of the sensor chip 12 included in the solid-state image pickup device. The sensor chip 12 includes a sensor unit 21, a line memory 22, a focus adjustment circuit 23, a downstream signal processing circuit 24, a system timing generation circuit (SG) 25, a command decoder 26, and a serial interface (I/F) 27.

In the sensor unit 21, a pixel array 211 and a column type analog/digital converter (ADC) 212 are arranged. In the pixel array 211, photodiodes (pixels) as photoelectric transducers that convert a signal of light condensed by the optical lens 11 into an electric signal are two-dimensionally arranged on a silicon semiconductor substrate. Respective color filters consisting of four types of wavelength separating means for W (transparent), B (blue), G (green), and R (red) are arranged on front surfaces of the photodiodes. As a color arrangement in the color filters, 8 pixels of W having a checkered pattern, 4 pixels of G, 2 pixels of R, and 2 pixels of B are arranged in a basic 4×4 pixel arrangement. In the sensor unit 21, a wavelength of light that enters the photodiodes is divided into four by the color filters, and they are converted into signal charges by the two-dimensional photodiode array, and further converted into digital signals by the ADC 212 to be output. Further, a non-illustrated microlens is arranged in each pixel.

Output signals from the sensor unit 21 are supplied to the line memory 22, and the output signals corresponding to, e.g., vertical 7 lines are stored in the line memory 22. The signals corresponding to the 7 lines are read out in parallel to be input to the focus adjustment circuit 23.

In the focus adjustment circuit 23, a plurality of pixel interpolation circuits 231a to 231d execute interpolation processing with respect to the respective signals W, B, G, and R. The signals subjected to the interpolation processing are supplied to a plurality of contour extraction circuits 232a to 232d in parallel, thereby extracting respective contour signals Ew, Eb', Eg', and Er'. Furthermore, the respective signals B, G, and R subjected to the interpolation processing are supplied to a plurality of low-pass filter (LPF) circuits 233a to 233c in parallel where signals having respective signal bands limited to low frequencies, e.g., signals from which high-frequency signals are removed are generated. The contour signals Ew, Eb', Eb', and Er' extracted by the plurality of contour extraction circuits 232a to 232d are supplied to a contour signal selection circuit 234. A control signal PSEL consisting of, e.g., 4 bits output from the command decoder 26 is supplied to the contour signal selection circuit 234. The contour signal selection circuit 234 outputs a contour signal PEw having a desired wavelength band in accordance with the contour signals Ew, Eb', Eg' and Er' and the control signal PSEL. A level of the contour signal PEw output from the contour signal selection circuit 234 is appropriately adjusted by a level adjustment circuit 235. The level adjustment circuit 235 outputs contour signals PEwa and PEwb. The contour signal PEwa is supplied to a plurality of addition circuits 236a to 236c. In the addition circuits 236a to 236c, the signals B, G, and R limited to low frequencies which are output from the plurality of LPF circuits 233a to 233c are added to the contour signal PEwa subjected to the level adjustment, respectively.

The signals Gle, Rle, and Ble subjected to the addition in the plurality of LPF circuits 233a to 233c and the level-adjusted contour signal PEwb are supplied to the downstream signal processing circuit 24. In the downstream signal processing circuit 24, general white balance adjustment, color adjustment (an RGB matrix), γ correction, YUV conversion processing, and others are executed, and these signals are output as digital signals DOUT0 to DOUT7 having a YUV signal format or an RGB signal format.

FIG. 2 shows a detailed configuration of the downstream signal processing circuit 24. The downstream signal processing circuit 24 includes a white balance adjustment circuit 241, an RGB matrix circuit 242, a γ correction circuit 243, a YUV conversion circuit 244, etc. The white balance adjustment circuit 241 receives signals Gle, Rle and Ble output from the focus adjustment circuit 23 and makes white balance adjustment. With respect to output signals Gg, Rg and Bg of the white balance adjustment circuit 241, the RGB matrix circuit 242 executes, for example, the operation expressed by the following formula (1):

$$\begin{bmatrix} Rm \\ Gm \\ Bm \end{bmatrix} = \begin{bmatrix} 1.752 & -0.822 & 0.072 \\ -0.188 & 1.655 & -0.467 \\ -0.085 & -0.723 & 1.808 \end{bmatrix} * \begin{bmatrix} Rg \\ Gg \\ Bg \end{bmatrix} \quad (1)$$

The coefficients in formula (1) can be varied in accordance with the spectral characteristics, color temperature, color reproduction characteristics of a sensor.

With respect to output signals R, G and B of the γ correction circuit 243, the YUV conversion circuit 244 executes, for example, the operation expressed by the following formula (2):

$$\begin{bmatrix} Y \\ U \\ V \end{bmatrix} = \begin{bmatrix} 0.299 & 0.588 & 0.113 \\ -0.147 & -0.289 & 0.436 \\ 0.345 & -0.289 & -0.56 \end{bmatrix} * \begin{bmatrix} Rin \\ Gin \\ Bin \end{bmatrix} + \begin{bmatrix} 0 \\ 128 \\ 128 \end{bmatrix} \quad (2)$$

Normally, the numerical values in formula (2) are fixed values so that the conversion of R, G and B signals and the conversion of YUV signals can be executed in common. A Y signal output from the YUV conversion circuit 244 is added to contour signal PEwb output from the focus adjustment circuit 23, at a downstream position of the YUV conversion circuit 244. The downstream signal processing circuit 24 outputs digital signals DOUT0-DOUT7 of either YUV signal format or RGB signal format.

As can be understood from the above, the addition of contour signals is performed when the addition circuits 236a to 236c add signals B, G and R to contour signal PEwa and/or when the downstream signal processing circuit 24 adds the Y signal obtained after the YUV conversion processing to contour signal PEwb.

A master clock signal MCK is supplied to the system timing generation circuit 25 from the outside. The system timing generation circuit 25 outputs a clock signal that controls operations of the sensor unit 21, the line memory 22, and the focus adjustment circuit 23.

Moreover, the operations of the line memory 22, the focus adjustment circuit 23, and the system timing generation circuit 25 are controlled by a command. For example, data DATA which is input from the outside is input to the command decoder 26 through the serial interface 27, and a decoded control signal is input to each circuit, thereby controlling parameters and others for processing based on the external input data DATA.

On the other hand, the digital signals DOUT0 to DOUT7 output from the downstream signal processing circuit 24 are supplied to a processor such as a non-illustrated digital signal processor (DSP), thereby generating focus information that is used for focusing. As an example of focus information generation method, a facial part of a person is specified, and focus information with which the specified part can be focused is generated. The generated focus information is supplied as a part of the data DATA to the serial interface 27 in the sensor chip 12. Moreover, this focus information can be also generated in the downstream signal processing circuit 24.

FIGS. 4A to 4D are views showing how interpolation processing for the respective signals W, G, R, and B is executed in the pixel interpolation circuits 231a to 231d in FIG. 1. It is to be noted that signals before the interpolation processing are shown on an upper side of each of FIGS. 4A to 4D, and signals after the interpolation processing are shown on a lower side of the same. In each drawing, when 2 arrows are provided, interpolation is executed with an average value of signals of 2 pixels. When 3 arrows are provided, interpolation is executed with an average value of signals of 3 pixels. When 4 arrows are provided, interpolation is executed with an average value of signals of 4 pixels. For example, paying attention to processing of the pixel interpolation circuit 231d depicted in FIG. 4A, a signal W at a position surrounded by signals W1, W3, W4, and W6 at 4 positions is interpolated with an average value of these signals W1, W3, W4, and W6 at the 4 positions. Additionally, paying attention to processing of the pixel interpolation circuit 231b depicted in FIG. 4B, a signal G placed between signals G1 and G2 at 2 positions is interpolated with an average value of the signals G1 and G2 at the 2 positions, and a signal-G placed at the center of signals G1, G2, G3, and G4 at 4 positions is interpolated with an average value of the signals G1, G2, G3, and G4 at the 4 positions.

FIGS. 5A to 5C are views showing how processing is executed in the contour extraction circuit 232d that generates a contour signal Ew by extracting a contour of the pixels W in the plurality of contour extraction circuits 232a to 232d in FIG. 1.

According to a method depicted in FIG. 5A, a gain is multiplied by 8 with respect to a central pixel in a 3×3 pixel area, a gain is multiplied by −1 with respect to each of surrounding 8 pixels, and a signals of these 9 pixels are added to generate the contour signal Ew. In a uniform object, the contour signal Ew becomes 0. On the other hand, when a vertical-striped or horizontal-striped pattern is produced, the contour signal is generated.

According to a method depicted in FIG. 5B, a gain is multiplied by 4 with respect to a central pixel in a 3×3 pixel area, a gain is multiplied by −1 with respect to each of 4 pixels which are adjacent to the central pixel in oblique directions, and signals of these 5 pixels are added to generate the contour signal Ew.

According to a method depicted in FIG. 5C, a gain is multiplied by 32 with respect to a central pixel in a 5×5 pixel area, a gain is multiplied by −2 with respect to each of 8 pixels surrounding the central pixel, a gain is multiplied by −1 with respect to each of 16 pixels surrounding the 8 pixels, and signals of these 25 pixels are added to generate the contour signal Ew.

For generation of the contour signal, various methods other than the above methods can be used. For example, besides the 3×3 pixel area and the 5×5 pixel area, a 7×7 pixel area may be adopted, and weighting (the gain) of each pixel can be changed. The contour signal in the respective pixels R, G, and B other than the pixels W can be generated by the same methods as those depicted in FIGS. 5A to 5C. At this time, the 7×7 pixel area can be used to generate the contour signal.

FIG. 6 is a view showing how high-frequency removal processing for signals is carried out in the plurality of LPF circuits 233a to 233c in FIG. 1. In this example, a 5×5 pixel area is used to perform the processing. According to a method depicted in FIG. 6, a gain is multiplied by 36 with respect to a central pixel in the 5×5 pixel area, a gain is multiplied by 24 with respect to each of 4 pixels placed at upper, lower, left, and right positions of the central pixel, a gain is multiplied by 16 with respect to each of 4 pixels placed in oblique directions of the central pixel, a gain is multiplied by 6 with respect to each of 4 pixels placed at the upper, lower, left, and right positions of the central pixel to sandwich 1 pixel therebetween, and a gain is multiplied by 1 with respect to each of 4 pixels placed in the oblique directions of the central pixel to sandwich one pixel therebetween. Moreover, a gain is multiplied by 4 with respect to each of 8 pixels which is placed between each pixel which is placed at the outermost periphery of the 5×5 pixel area and has the gain multiplied by 6 and each pixel which has the gain multiplied by 1, and the above-described pixels are added, the added signal is divided by 256, and a result is obtained as an LPF output signal. This processing is sequentially carried out in accordance with each pixel with respect to each signal B, G, or R.

Figures 7A, 7B:
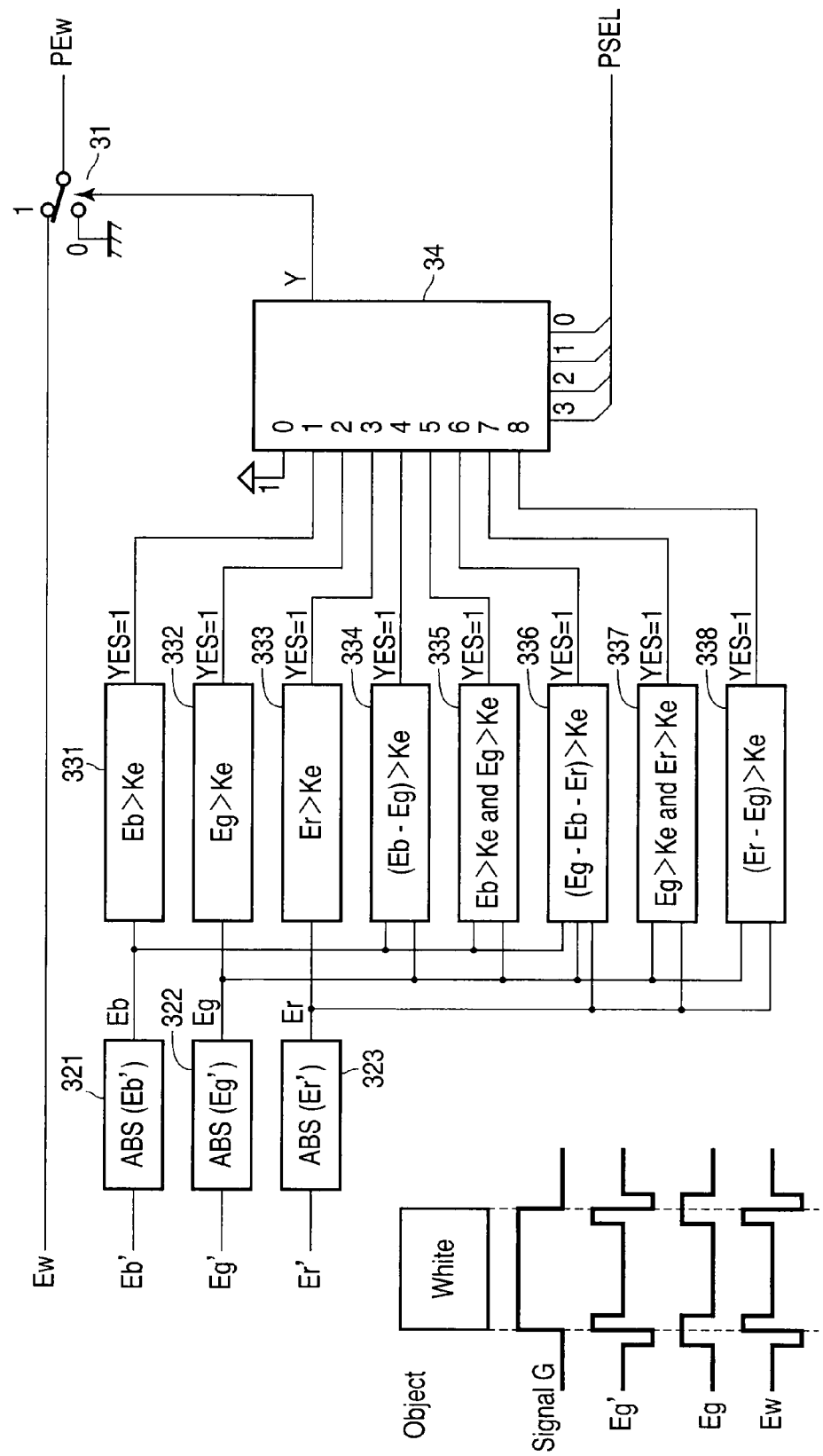
FIGS. 7A and 7B are a block diagram showing an example of a configuration of a contour signal selection circuit in FIG. 1 and a signal waveform diagram showing an example of signal waveforms in a primary part of the circuit.

FIG. 7A is a block diagram showing a configuration of the contour signal selection circuit 234 in FIG. 1, and FIG. 7B is a signal waveform diagram showing an example of signal waveforms of a primary part in the circuit depicted in FIG. 7A. The contour signal Ew of the signals W output from the contour extraction circuit 232d in FIG. 1 is supplied to a switch circuit 31. Further, the contour signals Eb', Eg', and Er' of the signals B, the signals G, and the signals R output from the other contour extraction circuits 232a to 232c are supplied to absolute value circuits (ABS) 321 to 323 in parallel, and contour signals Eb, Eg, and Er each taking an absolute value are output. When a white object is imaged, the contour signal becomes a signal having positive and negative amplitudes along an edge of the object as indicated by Ew or Eg' in FIG. 7B. When the object has large contrast, its signal level is also large. The contour signals of R, G, and B are output as positive signals Eb, Eg, and Er whose negative signs are inverted by the absolute value circuits 321 to 323. These output signals are supplied to a plurality of arithmetic processing circuits 331 to 338.

The arithmetic processing circuit 331 outputs a logic 1 (YES=1) when Eb>Ke and outputs a logic 0 in any other case based on an intensity relationship between the contour signal Eb and a preset fixed reference signal level Ke. The arithmetic processing circuit 332 outputs the logic 1 (YES=1) when Eg>Ke and outputs the logic 0 in any other case based on an intensity relationship between the contour signal Eg and the reference signal level Ke. The arithmetic processing circuit 333 outputs the logic 1 (YES=1) when Er>Ke and outputs the logic 0 in any other case based on an intensity relationship between the contour signal Er and the reference signal level Ke. The arithmetic processing circuit 334 outputs the logic 1 (YES=1) when (Eb−Eg)>Ke and outputs the logic 0 in any other case based on an intensity relationship between a signal (Eb−Eg) as a difference of the contour signals Eb and Eg and the reference signal level Ke. The arithmetic processing circuit 335 outputs the logic 1 (YES=1) when Eb>Ke and Eg>Ke and outputs the logic 0 in any other case based on an intensity relationship between each of the contour signals Eb and Eg and the reference signal level Ke. The arithmetic processing circuit 336 outputs the logic 1 (YES=1) when (Eg−Eb−Er)>Ke and outputs the logic 0 in any other case based on an intensity relationship between a signal (Eg−Eb−Er) obtained by subtracting the contour signals Eb and Er from the contour signal Eg and the reference signal level Ke. The arithmetic processing circuit 337 outputs the logic 1 (YES=1) when Eg>Ke and Er>Ke and outputs the logic 0 in any other case based on an intensity relationship between each of the contour signals Eg and Er and the reference signal level. The arithmetic processing circuit 338 outputs the logic 1 (YES=1) when (Er−Eg)>Ke and outputs the logic 0 in any other case based on an intensity relationship between a signal (Er−Eg) as a difference of the contour signals Er and Eg and the reference signal level Ke. Logic operation output signals from the arithmetic processing circuits 331 to 338 are supplied to input terminals "1" to "8" of a selector 34 in parallel. A signal indicative of the logic 1 is supplied to an input terminal "0" of the selector 34. The selector 34 selects the signals supplied to the input terminals "0" to "8" based on the 4-bit control signal PSEL, and outputs a selected signal from an output terminal Y.

The switch circuit 31 is controlled to be switched in accordance with the output signal from the selector 34, outputs the control signal Ew as PEw when the output signal from the selector 34 corresponds to the logic 1, and outputs 0 as PEw when the output signal from the selector 34 corresponds to the logic 0. That is, the output signal from the selector 34 controls whether the contour signal Ew is enabled to be output as PEw or disabled.

Figure 8A:
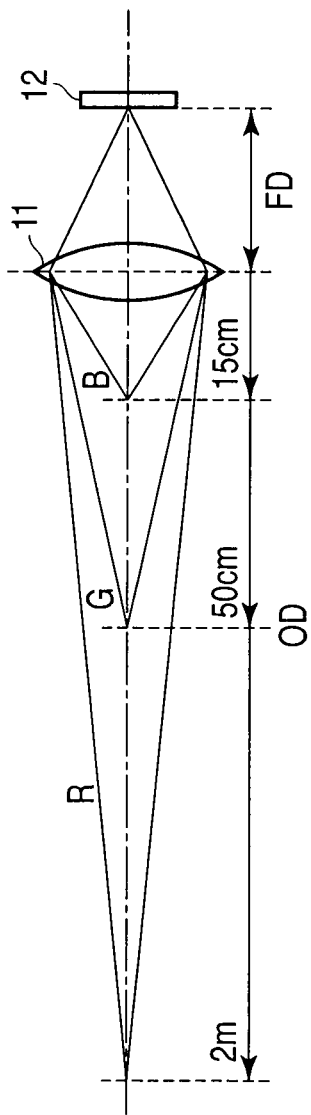
FIGS. 8A and 8B are characteristic views showing characteristics of an optical lens depicted in FIG. 3.
Figure 8B:
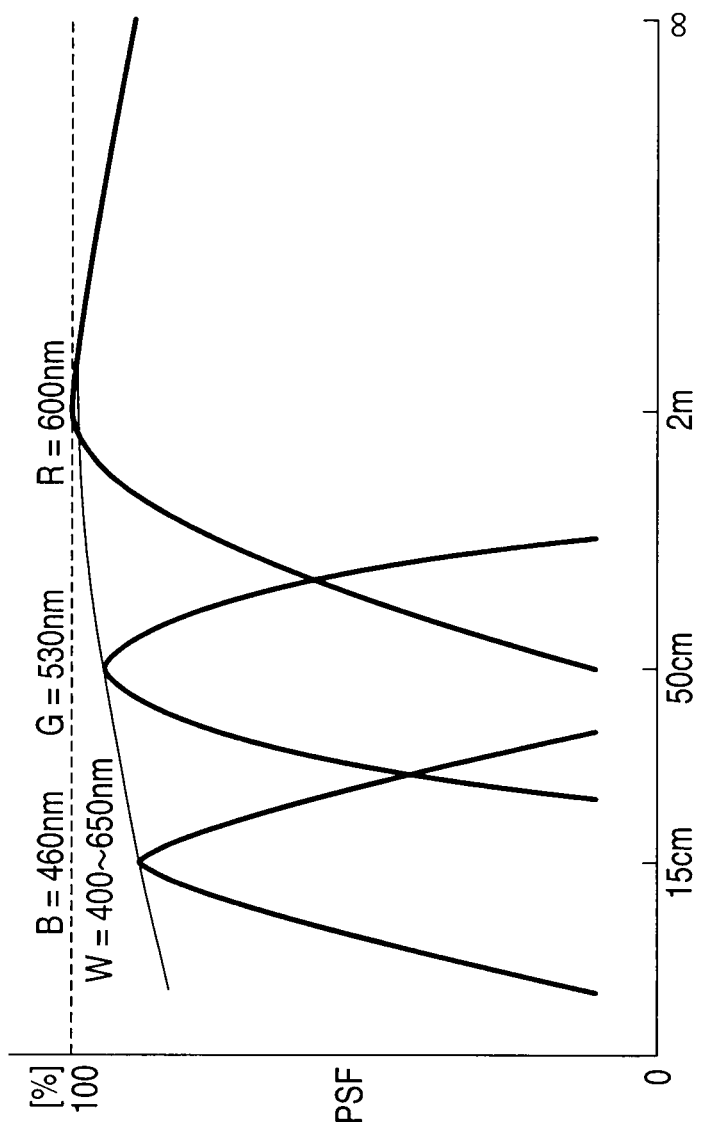

FIGS. 8A and 8B are characteristic views showing characteristics of the optical lens 11 (the chromatic aberration lens) depicted in FIG. 3. A regular lens has a refraction factor that differs depending on a wavelength of light, and hence chromatic aberration occurs. Therefore, this chromatic aberration is corrected by combining lenses formed of different materials. In this embodiment, this chromatic aberration is positively exploited to increase a depth of field.

FIG. 8A shows focal characteristic of the chromatic aberration lens. In regard to the signal B having a peak wavelength of 460 nm, the lens 11 is designed in such a manner that the sensor chip 12 is focused when a distance to a physical body (an object) is 15 cm. Furthermore, in regard to the signal G having a peak wavelength of 530 nm, the lens 11 is designed by utilizing the chromatic aberration in such a manner that the sensor chip 12 is focused when a distance to the object (the physical body) is 50 cm. In regard to the signal R having a peak wavelength of 600 nm, the lens 11 is designed by utilizing the chromatic aberration in such a manner that the sensor chip 12 is focused when a distance to the object (the physical body) is 2 m.

FIG. 8B is a characteristic view showing a relationship between a distance OD to the physical body and a PSF (a point spread function) in each peak wavelength B=460 nm, G=530 nm, or R=600 nm. Moreover, FIG. 7B also shows a change in peak value of the PSF at each single wavelength in the range of 400 to 650 nm in the transparent pixel. That is, in case of the pixel W, high PSF can be continuously obtained from approximately 15 cm to the infinity. Although there is a problem that a reduction in resolution (the PSF) occurs from color running due to the chromatic aberration in conventional examples, the color running can be greatly reduced in this embodiment, thus obtaining the high PSF.

Figures 9A, 9B:
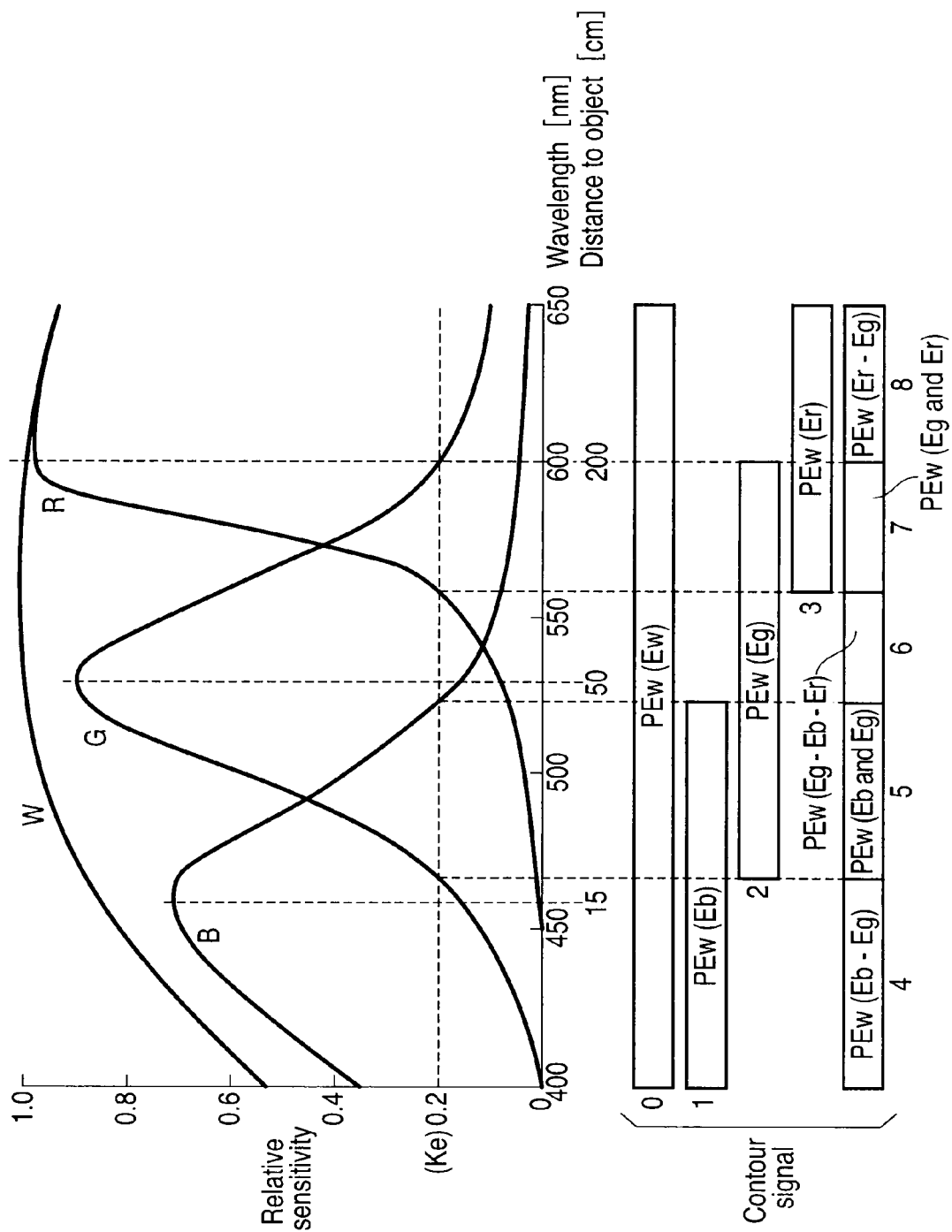
FIGS. 9A and 9B are a characteristic view showing spectral sensitivity characteristics of the solid-state image pickup device according to the first embodiment and a characteristic view showing an output result of the contour signal in the contour signal selection circuit in FIG. 7A.

FIG. 9A is a characteristic view showing spectral sensitivity characteristics of the solid-state image pickup device according to this embodiment, and FIG. 9B is a characteristic view showing an output result of the contour signal from the contour signal selection circuit 234 in FIG. 7A. A peak of spectral characteristics of the signal B is 460 nm, a peak of the spectral characteristics of the signal G is 530 nm, and a peak of the spectral characteristics of the signal R is 600 nm. The signal W has a high sensitivity because of a transparent layer and has smooth characteristics from 400 nm to 650 nm.

As shown in FIG. 9B, when the input "0" is selected in the selector 34 in FIG. 7A, the contour signal Ew is output as the contour signal PEw. In this case, a continuous resolution can be obtained from the distance of approximately 13 cm to the infinity. When the input "1" is selected in the selector 34, a contour signal PEw(Eb) associated with a region of the signal B is output as the contour signal PEw. At this time, assuming that a judgment level Ke for the contour signal used in the contour signal selection circuit 234 in FIG. 7A is set to 20% of a relative sensitivity, a resolution of the contour signal PEw(Eb) is provided with respect to the range of approximately 13 cm to 50 cm alone. As a signal for the distance of 50 cm or above, a signal indicative of blurring alone is provided. When the input "2" is selected in the selector 34, a contour signal PEw(Eg) associated with a region of the signal G is output as the contour signal PEw. At this time, assuming that the judgment level Ke for the contour signal is likewise set to 20% of the relative sensitivity, it can be considered that a resolution of the contour signal PEw(Eg) is provided with respect to the range of approximately 16 cm to 200 cm alone. A signal for a distance close to this range is a signal indicative of blurring. Likewise, when the input "3" is selected in the selector 34, a contour signal PEw(Er) associated with a region of the signal R is output as the contour signal PEw. At this time, assuming that the judgment level Ke for the contour signal is likewise set to 20% of the relative sensitivity, a resolution of the contour signal PEw(Er) is provided with respect to the range of approximately 70 cm to the infinity. In regard to a distance smaller than 70 cm, a signal indicative of blurring is provided. Additionally, when the inputs "4", "5", "6", "7", and "8" are selected, respectively, in the selector 34, contour signals PEw associated with various regions are output as the contour signal PEw as shown in FIG. 9B.

In this manner, the contour signal selection circuit 234 outputs the contour signal having a desired wavelength band in accordance with the control signal PSEL, and the distance range with which the resolution is obtained can be finely set based on the control signal PSEL. Further, changing the judgment reference level Ke for the contour signal enables changing the distance range with which the contour signal PEw is obtained.

When this contour signal selection circuit is used, the control signal PSEL can be utilized to generate an image with perspective in which a person is focused and a background blurs like the conventional AF. Furthermore, selecting the contour signal PEw for the signal W as the contour signal Ew can realize a setting in which the depth of field is increased to avoid a defocus failure or avoid missing a time for the click of a shutter.

As explained above, the solid-state image pickup device according to the first embodiment can electronically execute focus control and arbitrarily select a focus depth.

Second Embodiment

Figure 10:
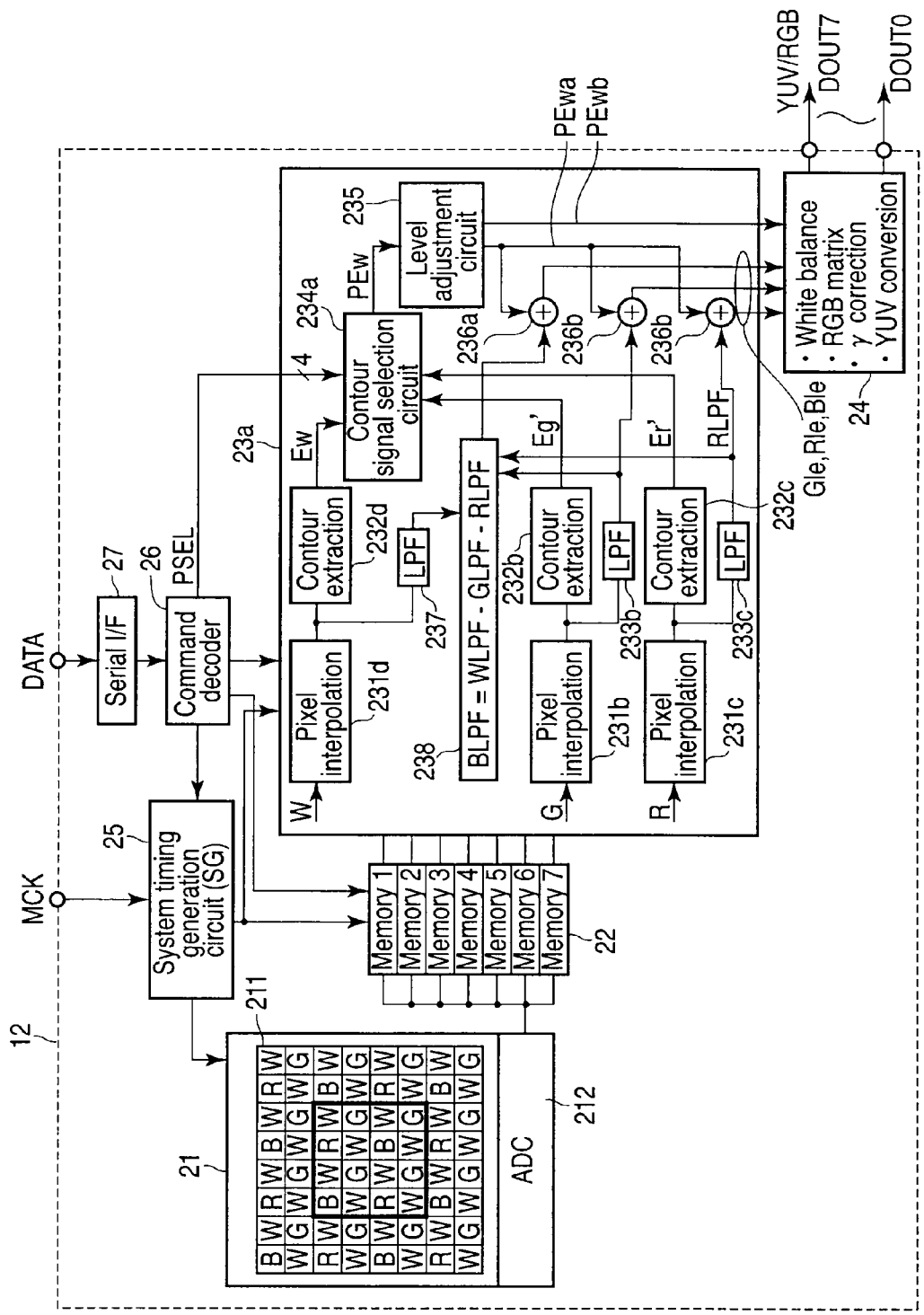
FIG. 10 is a block diagram showing a circuit configuration of a sensor chip used in a solid-state image pickup device according to a second embodiment.

FIG. 10 is a block diagram showing a circuit configuration of a sensor chip 12 which is used in a solid-state image pickup device according to a second embodiment. It is to be noted that, like the first embodiment, a chromatic aberration lens having characteristics that a focal position differs depending on a wavelength of each band of R (red), G (green), or B (blue) is used as an optical lens 11.

The sensor chip 12 according to this embodiment is different from that according to the first embodiment in a color arrangement of color filters in a sensor unit 21, namely, 8 W pixels having a checkered pattern, 4 pixels G, and 4 pixels R are arranged in a basic 4×4 pixel arrangement. When such color filters are adopted, an output of a signal R is doubled as compared with the sensor chip according to the first embodiment. As a result, a signal of a high resolution equal to that of the pixels G can be obtained as a contour signal of the pixels R. With such a change in color arrangement of the color filters, a focus adjustment circuit is also partially changed. That is, since a focus adjustment circuit 23a according to this embodiment has no input for a signal B, a pixel interpolation circuit and a contour extraction circuit for the signal B are omitted. Furthermore, an LPF output signal of each signal B is generated as follows. An LPF circuit 237 is used to remove a high-frequency signal from a signal that has interpolated the pixel W, and an LPF output of the signal G and an LPF output of the signal R are subtracted from an LPF output of the signal W by using a subtraction circuit 238, namely, subtraction (BLPF=WLPF−GLPF−RLPF) is carried out. Moreover, contour signals Ew, Eg', and Er' extracted by a plurality of contour extraction circuits 232b to 232d and a control signal PSEL are supplied to a contour signal selection circuit 234a, and the contour signal selection circuit 234a outputs a contour signal PEw having a desired wavelength band in accordance with the contour signals Ew, Eg', and Er' and the control signal PSEL.

Figures 11A, 11B, 11C:
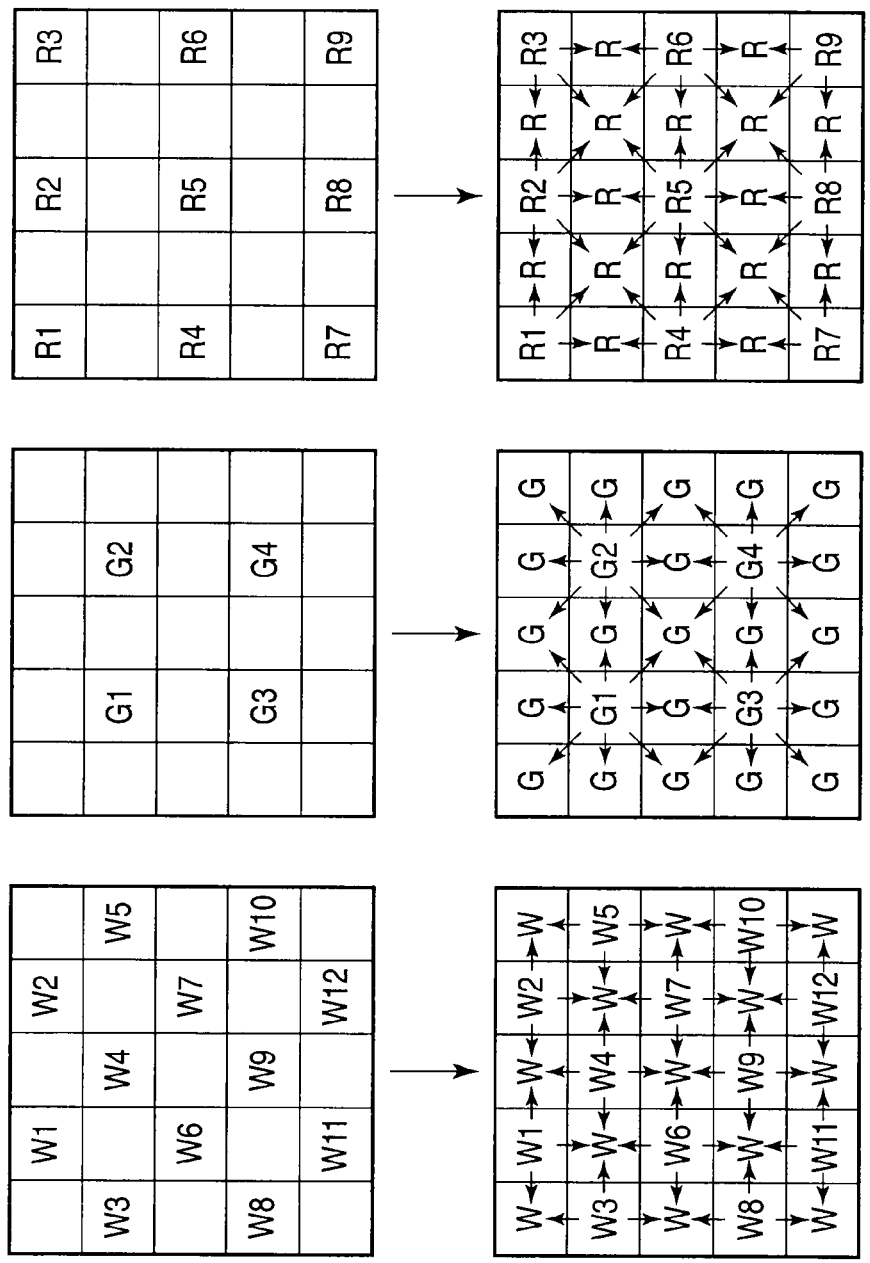
FIGS. 11A to 11C are views showing how interpolation processing for signals of a transparent pixel, a blue pixel, a green pixel, and a red pixel is executed in pixel interpolation circuits in FIG. 10.

FIGS. 11A to 11C are views showing how interpolation processing for the respective signals W, G, and R is carried out in pixel interpolation circuits 231b to 231d in FIG. 10. It is to be noted that signals before the interpolation are shown on an upper side and signals after the interpolation are shown on a lower side in each of FIGS. 11A to 11C. In the drawings, the interpolation is performed with an average value of signals of 2 pixels when 2 arrows are provided, and the interpolation is performed with an average value of signals of 4 pixels when 4 arrows are provided. For example, paying attention to processing of the pixel interpolation circuit 231d depicted in FIG. 11A, a signal W at a position surrounded by signals W1, W3, W4, and W6 at 4 positions is interpolated with an average value of the signals W1, W3, W4, and W6 at the 4 positions. Further, paying attention to processing of the pixel interpolation circuit 231c depicted in FIG. 11C, a signal R placed at the center of signals R1, R2, R4, and R5 at 4 positions is interpolated with an average value of the signals R1, R2, R4, and R5 at the 4 positions, and a signal R placed between the signals R1 and R2 at the 2 positions is interpolated with an average value of the signals R1 and R2 at the 2 positions.

Figures 12A, 12B:
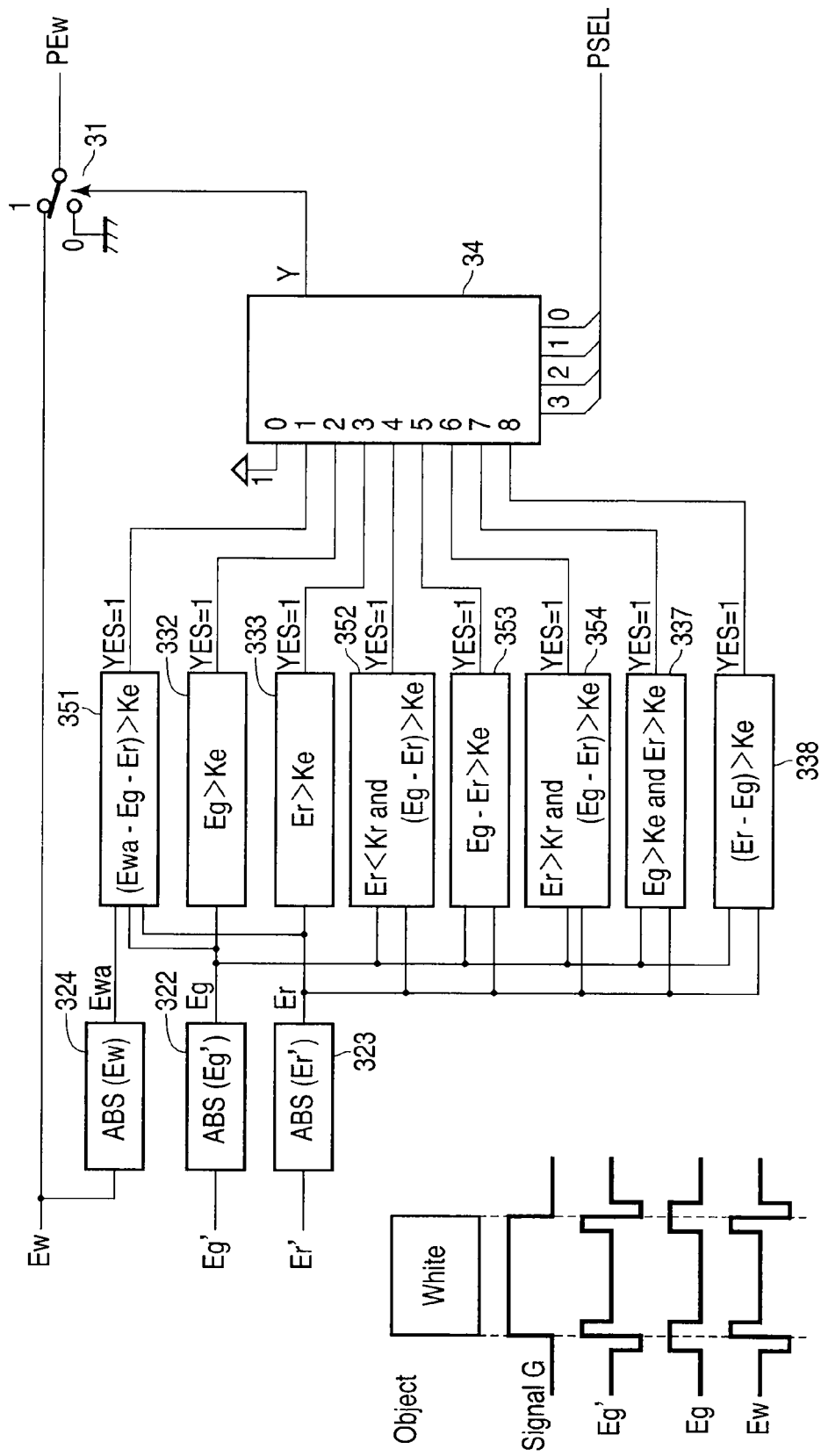
FIGS. 12A and 12B are block diagram showing a configuration of a contour signal selection circuit in FIG. 10 and a signal waveform diagram showing an example of signal waveforms in a primary part of the circuit.

FIG. 12A is a block diagram showing a configuration of the contour signal selection circuit 234a depicted in FIG. 10, and FIG. 12B is a signal waveform diagram showing an example of signal waveforms in a primary part of the circuit. Since the contour signal selection circuit 234a in FIG. 12A does not have a contour signal Input (Eb') for the signal B, the absolute value circuit 321 in FIG. 7A is omitted, and an absolute value circuit 324 that takes an absolute value of a contour signal Ew of the signal W and outputs a contour signal Ewa is provided instead. Moreover, in place of the arithmetic processing circuits 331 and 334 to 336 that receive the contour signal Eb' of the signal B in the plurality of arithmetic processing circuits 331 to 338 in FIG. 7A, arithmetic processing circuits 351 to 354 are provided. Additionally, in the contour signal selection circuit 234a in this example, a second reference signal level Kr is used in addition to the reference signal level Ke utilized in the first embodiment.

The arithmetic processing circuit 351 outputs a logic 1 (YES=1) when (Ewa−Eg−Er)>Ke and outputs a logic 0 in any other case based on an intensity relationship between a signal obtained by subtracting contour signals Eg and Er from the contour signal Ewa and the preset fixed reference signal level Ke. The arithmetic processing circuit 352 outputs the logic 1 (YES=1) when Er<Kr and (Eg−Er)>Ke and outputs the logic 0 in any other case based on an intensity relationship between the contour signal Er and the reference signal level Kr and an intensity relationship between a signal (Eg−Er) as a difference between the contour signals Eg and Er and the reference signal level Ke. The arithmetic processing circuit 353 outputs the logic 1 (YES=1) when (Eg−Er)>Ke and outputs the logic 0 in any other case based on an intensity relationship between the signal (Eg−Er) as a difference between the contour signals Eg and Er and the reference signal level Ke. The arithmetic processing circuit 354 outputs the logic 1 (YES=1) when Er>Kr and (Eg−Er)>Ke and outputs the logic 0 in any other case based on an intensity relationship between the contour signal Er and the preset fixed reference signal level Kr and an intensity relationship between the signal (Eg−Er) as a difference between the contour signals Eg and Er and the reference signal level Ke. Operations of the other arithmetic processing circuits 332, 333, 337, and 338 are the same as those in FIG. 7A.

The logic operation output signals from the arithmetic processing circuits 351, 332, 333, 352, 353, 354, 337, and 338 are supplied to input terminals "1" to "8" of a selector 34 in parallel. A signal of the logic 1 is supplied to an input terminal "0" of the selector 34. The selector 34 selects a signal supplied to the input terminals "0" to "8" based on the 4-bit control signal PSEL and outputs the selected signal from an output terminal Y.

A switch circuit 31 is controlled to be switched in accordance with an output signal from the selector 34, outputs the contour signal Ew as PEw when an output signal from the selector 34 is indicative of the logic 1, and outputs 0 as PEw when the output signal from the selector 34 is indicative of the logic 0. That is, the output signal from the selector 34 controls whether the contour signal Ew is enabled to be output as PEw or disabled.

FIG. 13A is a characteristic view showing spectral sensitivity characteristics of the solid-state image pickup apparatus according to this embodiment, and FIG. 13B is a characteristic view showing an output result of the contour signal in the contour signal selection circuit 234a in FIG. 12A. Since this embodiment does not use the pixels B, three types of spectral characteristic curves are provided for W, G, and R. A peak of spectral characteristics of the signal G is 530 nm, and a peak of spectral characteristics of the signal R is 600 nm. The signal W has a high sensitivity because of a transparent layer and has smooth characteristics from 400 nm to 650 nm.

As shown in FIG. 13B, when the input "0" is selected in the selector 34 in FIG. 12A, the contour signal Ew is output as the contour signal PEw. In this case, a continuous resolution can be obtained from the distance of approximately 13 cm to the infinity. When the input "2" is selected in the selector 34, a contour signal PEw(Eg) associated with a region of the signal G is output as the contour signal PEw. At this time, assuming that the judgment reference level Ke for the contour signal used in the contour signal selection circuit 234a in FIG. 12A is set to 20% of a relative sensitivity, a resolution of the contour signal PEw(Eg) is provided with respect to the range of approximately 16 cm to 200 cm alone. A signal for a distance close to this range is a signal indicative of blurring. Likewise, when the input "3" is selected in the selector 34, a contour signal PEw(Er) associated with a region of the signal R is output as the contour signal PEw. At this time, assuming that the judgment reference level Ke for the contour signal is likewise set to 20% of the relative sensitivity, a resolution of the contour signal PEw(Er) is provided with respect to the range of approximately 70 cm to the infinity. As a signal for the distance of 70 cm or below, a signal indicative of blurring is provided. Additionally, when the inputs "1", "5", "7", "8", "4", and "6" are selected in the selector 34, the distance range with which the resolution signal PEw is obtained can be finely set. The second reference signal level Kr is set to approximately 10% of the relatively sensitivity. Further, changing the judgment reference level Kr or Ke enables varying the distance range with which the resolution signal PEw is obtained.

It is to be noted that the pixel W has the high sensitivity that is approximately double the sensitivity of the signal G, which is also true in the first embodiment. Therefore, signal charges photoelectrically converted in a silicon semiconductor substrate are diffused and mixed into other pixels, color mixture to the signals R, G, and B occurs. The sensitivity can be lowered by decreasing a size of a microlens arranged in each pixel W to be smaller than that in any other pixel, thereby reducing this color mixture.

This embodiment can obtain the same effects as those in the first embodiment. That is, focus control can be electronically carried out, and a depth of focus can be arbitrarily selected.

It is to be noted that, in this embodiment, the description has been given as to the color filters having the color arrangement that the 8 pixels W having a checkered pattern, the 4 pixels G, and the 4 pixels R are arranged in the basic 4×4 pixel arrangement is used and the LPF output of the signal G and the LPF output of the signal R are subtracted from the LPF output of the signal W to obtain the LPF output signal of the signal B by using the subtraction circuit 238. However, as a modification, the color filters having a color arrangement that the pixels W, the pixels G, and the pixels B are arranged may be used and the LPF output of the signal G and the LPF output of the signal B may be subtracted from the LPF output of the signal W to obtain the LPF output signal of the signal R by using the subtraction circuit, or the color filters having a color arrangement that the pixels W, the pixels R, and the pixels B are arranged may be used and the LPF output of the signal R and the LPF output of the signal B may be subtracted from the LPF output of the signal W to obtain the LPF output signal of the signal G by using the subtraction circuit.

Third Embodiment

FIG. 14 is a block diagram showing a circuit configuration of a sensor chip 12 used in a solid-state image pickup device according to a third embodiment. It is to be noted that a chromatic aberration lens having characteristics that a focus position differs depending on a wavelength of each band of R (red), G (green), or B (blue) is used as an optical lens 11 like the first embodiment.

The sensor chip 12 according to this embodiment is different from that according to the first embodiment in that a color arrangement of color filters in a sensor unit 21 is a general Bayer arrangement that two pixels G, one pixel B, and one pixel R are arranged in a basic 2×2 pixel arrangement. With such a change in color arrangement of the color filters, a focus adjustment circuit is also partially changed. That is, since a focus adjustment circuit 23b according to this embodiment does not have an input for signals W, a pixel interpolation circuit and a contour extraction circuit for the signals W are omitted. Furthermore, a contour signal synthesis circuit 239 combines the contour signal Eb' of the signal B, the contour signal Eg' of the signal G, and the contour signal Er' of the signal R to generate a contour signal Ew for the signal W. Moreover, the contour signals Eb', Eg', and Er' extracted by a plurality of contour extraction circuits 232a to 232c, the contour signal Ew synthesized by the contour signal synthesis circuit 239, and the control signal PSEL are supplied to a contour signal selection circuit 234. The contour signal selection circuit 234 outputs a contour signal PEw having a desired wavelength band in accordance with these contour signals Eb', Eg', Er', and Ew and the control signal PSEL.

Figure 15C:
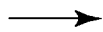
FIGS. 15A to 15C are views showing how interpolation processing for signals of a transparent pixel, a blue pixel, a green pixel, and a red pixel is executed in pixel interpolation circuits in FIG. 14.
Figure 15B:
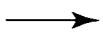
Figure 15A:

FIGS. 15A to 15C are views showing how interpolation processing for the respective signals G, R, and B is carried out in pixel interpolation circuits 231a to 231c in FIG. 14. It is to be noted that signals before the interpolation are shown on an upper side and signals after the interpolation are shown on a lower side of each of FIGS. 15A to 15C. In the drawings, the interpolation is performed with an average value of signals of 2 pixels when 2 arrows are provided, and the interpolation is carried out with an average value of signals of 4 pixels when 4 arrows are provided. For example, paying attention to the processing of the pixel interpolation circuit 231b depicted in FIG. 15A, a signal G at a position surrounded by signals G1, G3, G4, and G6 at 4 positions is interpolated with an average value of the signals G1, G3, G4, and G6 at the 4 positions. Moreover, paying attention to the processing of the pixel interpolation circuit 231a depicted in FIG. 15C, a signal B placed at the center of signals B1, B2, B4, and B5 at 4 positions is interpolated with an average value of the signals B1, B2, B4, and B5 at the 4 positions, and a signal B placed between the signals B4 and B5 at the 2 positions is interpolated with an average value of the signals B4 and B5 at the 2 positions.

Figures 16A, 16B:
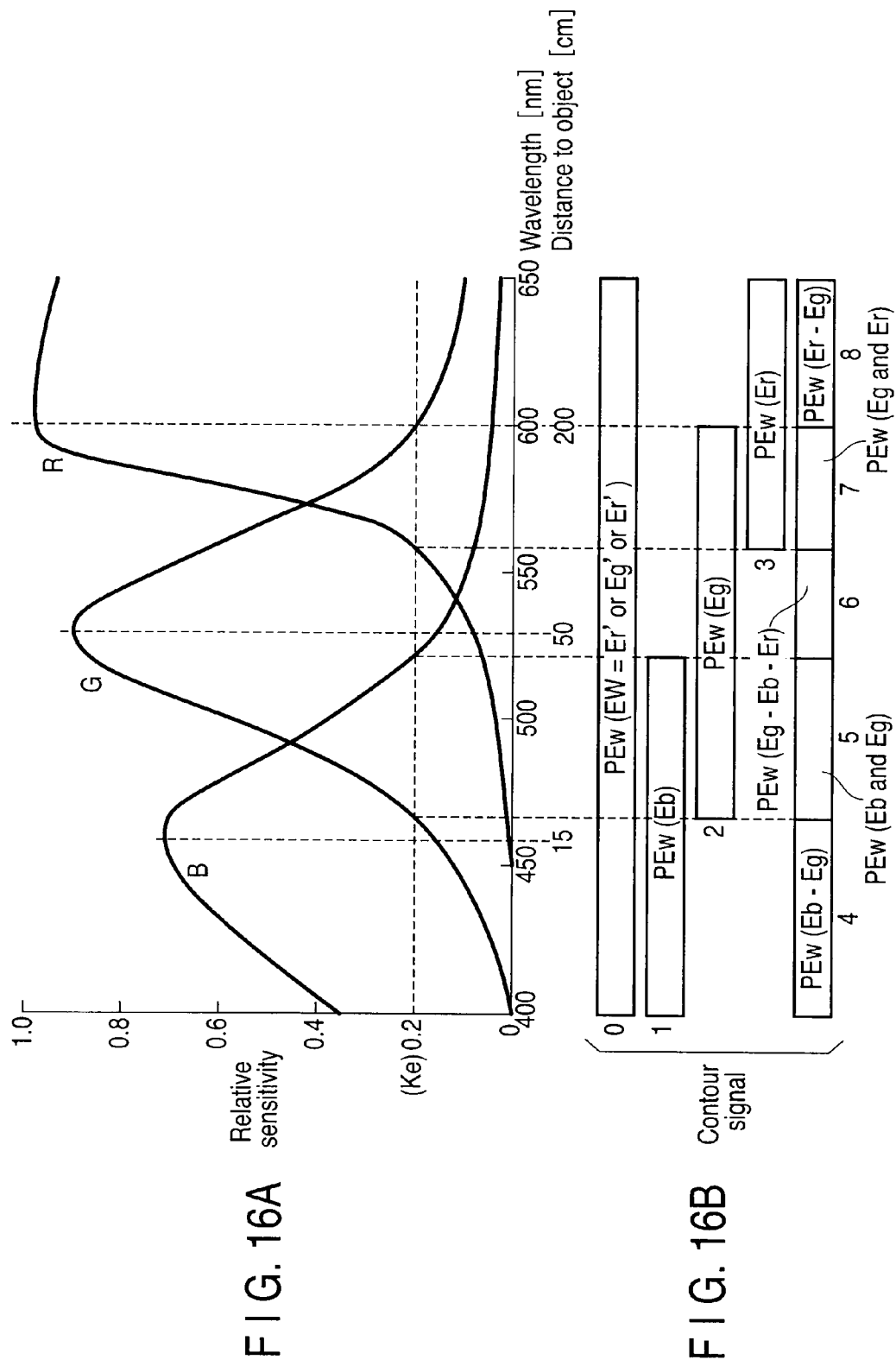
FIGS. 16A and 16B are a characteristic view showing spectral sensitivity characteristic of the solid-state image pickup device according to the third embodiment and a characteristic view showing an output result of a contour signal in a contour signal selection circuit in FIG. 14.

FIG. 16A is a characteristic view showing spectral sensitivity characteristics of the solid-state image pickup device according to this embodiment, and FIG. 16B is a characteristic view showing an output result of contour signals in the contour signal selection circuit 234 in FIG. 14. It is to be noted that, as the contour signal selection circuit 234 in this embodiment, the counterpart in the first embodiment depicted in FIG. 7A can be used. A peak of spectral characteristics of a signal B is 460 nm, a peak of spectral characteristics of a signal G is 530 nm, and a peak of spectral characteristics of a signal R is 600 nm.

As shown in FIG. 16B, when the input "0" is selected in the selector 34 in FIG. 7A, the contour signal Ew for the signal W synthesized by the contour signal synthesis circuit 239 is output as the contour signal PEw. In the contour signal synthesis circuit 239, for example, an OR logical operation of contour signals Eb', Eg', and Er' of the respective colors is executed to synthesize the contour signal Ew for the signal W. In this case, a continuous resolution can be obtained with respect to the distance of approximately 13 cm to the infinity. When the input "1" is selected in the selector 34, a contour signal PEw(Eb) associated with a region of the signal B is output as the contour signal PEw. At this time, assuming that a judgment reference level Ke for the contour signal used in the contour signal selection circuit 234 in FIG. 14 is set to 20% of a relative sensitivity, a resolution of the contour signal PEw(Eb) is provided with respect to the range of approximately 13 cm to 50 cm alone. As a signal for the distance of 50 cm or above, a signal indicative of blurring alone is provided. When the input "2" is selected in the selector 34, a contour signal PEw(Eg) associated with a region of the signal G is output as the contour signal PEw. At this time, assuming that the judgment reference level Ke for the contour signal is likewise set to 20% of the relative sensitivity, a resolution of the contour signal PEw(Eg) is provided with respect to the range of approximately 16 cm to 200 cm alone. A signal for a distance close to this range is a signal indicative of blurring. Likewise, when the input "3" is selected in the selector 34, a contour signal PEw(Er) associated with a region of the signal R is output as the contour signal PEw. At this time, assuming that the judgment reference level Ke for the contour signal is likewise set to 20% of the relative sensitivity, a resolution of the contour signal PEw(Er) is provided with respect to the range of approximately 70 cm to the infinity. In regard to a distance smaller than 70 cm, a signal indicative of blurring is provided. Additionally, when the inputs "4", "5", "6", "7", and "8" are selected, respectively, in the selector 34, contour signals PEw associated with various regions are output as the contour signal PEw as shown in FIG. 16B.

In this manner, the contour signal selection circuit 234 outputs the contour signal having a desired wavelength band in accordance with the control signal PSEL, and the distance range with which the resolution is obtained can be finely set based on the control signal PSEL. Further, changing the judgment reference level Ke for the contour signal enables changing the distance range with which the contour signal PEw is obtained.

This embodiment can obtain the same effects as those of the first embodiment. That is, the focus control can be electronically performed, and a depth of focus can be arbitrarily selected.

As explained above, according to the solid-state image pickup device of the present invention, the focus control can be electronically performed, and a depth of focus can be arbitrarily selected.

Moreover, the solid-state image pickup device according to the present invention can obtain the following various effects. Since the mechanical AF is not used, the device is hard to be destroyed even if it is dropped. A height of a module can be reduced. Decreasing the number of lenses enables further reducing the height of the module. When a value F of the lens is reduced, the sensitivity can be improved. In a fixed-focus operation with a large depth of focus, since the AF is not used, a shutter can be rapidly released, and hence a time for the click of the shutter is hardly missed. Additionally, defocus caused due to an erroneous operation of the AF can be avoided. In a digital automatic focus operation, since the mechanical AF operation is not performed, a point of focus can be instantaneously set. Mechanical degradation does not occur. A reproduced image having the same perspective as that in the mechanical AF can be obtained.

Further, although the description has been given as to the single-plate color camera in which the color arrangement of the color filters is RGB or WRGB in each of the foregoing embodiments, even a three-plate camera that uses a prism to obtain RGB signals of 3 primary colors can generate the chromatic aberration, improve the sensitivity based on the same principle, and reduce false colors at edges due to the chromatic aberration. When the color filter arrangement using the pixels W is adopted, the pixels W are arranged in a checkered pattern in order to obtain a resolution signal from each pixel W. The other color filters of R, G, and B have no restriction in arrangement in particular since the LPFs are used to provide hues.

The present invention is not restricted to each of the foregoing embodiments, and it can be modified in many ways without departing from the scope of the invention on an embodying stage. For example, each of the foregoing embodiments includes inventions on various stages, and appropriately combining a plurality of disclosed constituent requirements enables extracting various inventions. For example, even if several constituent requirements are eliminated from all constituent requirements disclosed in each embodiment, the problems described in the section "Problems to be Solved by the Invention" can be solved, and a configuration from which the constituent elements are eliminated can be extracted as the invention when the effects described in the section "Effects of the Invention" are obtained.

What is claimed is:

1. A solid-state image pickup device comprising:
   a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into at least 2 or more wavelength components to generate electrical wavelength signals; and
   a signal processing circuit which processes the at least 2 wavelength signals generated by the sensor unit,
   wherein the signal processing circuit includes:
   a plurality of contour signal extraction circuits which receive the at least 2 wavelength signals to extract respective contour signals; and
   a contour signal selection circuit which receives a control signal and the plurality of contour signals extracted by the plurality of contour signal extraction circuits, and selects and outputs a contour signal having a desired wavelength band in accordance with the control signal, and
   wherein the optical filters are color filters which separate the wavelength of the light into an all wavelength band, a blue wavelength band, a green wavelength band, and a red wavelength band, and
   the sensor unit generates wavelength signals associated with the all wavelength band, the blue wavelength band, the green wavelength band, and the red wavelength band as the wavelength signals.

2. The device according to claim 1, wherein the plurality of contour signal extraction circuits includes: a first contour signal extraction circuit which extracts a first contour signal from the wavelength signal having the all wavelength band generated by the sensor unit; a second contour signal extraction circuit which extracts a second contour signal from the wavelength signal having the blue wavelength band generated by the sensor unit; a third contour signal extraction circuit which extracts a third contour signal from the wavelength signal having the green wavelength band generated by the sensor unit; and a fourth contour signal extraction circuit which extracts a fourth contour signal from the wavelength signal having the red wavelength band generated in the sensor unit, and
   the contour signal selection circuit restricts the first contour signal based on the second to fourth contour signals to output a contour signal having a desired wavelength band.

3. The device according to claim 1, wherein the signal processing circuit further includes first to third low-pass filter circuits which receive the wavelength signals having the blue wavelength band, the green wavelength band, and the red wavelength band generated by the sensor unit.

4. The device according to claim 2, wherein the contour signal selection circuit includes:
   a wavelength band extraction circuit which receives the second, third and fourth contour signal, and extracts a plurality of desired wavelength bands by executing an arithmetic operation using the second, third and fourth contour signals and determination processing based on a predetermined reference level;
   a selector which selects one of the wavelength bands extracted by the wavelength band extraction circuit in accordance with the control signal; and
   a switch circuit which receives the first contour signal, and controls whether the first contour signal is enabled or disabled based on an output signal from the selector.

5. A solid-state image pickup device comprising:
   a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into 3 wavelength components, a first color wavelength band and a second color wavelength band using 2 out of a blue wavelength band, a green wavelength band, and a red wavelength band, and an all wavelength band to generate electrical wavelength signals; and
   a signal processing circuit which processes the 3 wavelength signals generated by the sensor unit,
   wherein the signal processing circuit includes: a wavelength signal generation circuit which receives the 3 wavelength signals having the all wavelength band, the first color wavelength band, and the second color wavelength band to generate a wavelength signal having a third color wavelength band;
   a plurality of contour signal extraction circuits which receive the 3 wavelength signals having the all wavelength band, the first color wavelength band, and the second wavelength band to extract contour signals, respectively; and
   a contour signal selection circuit which receives a control signal and the plurality of contour signals extracted by the plurality of contour signal extraction circuits, and selects and outputs a contour signal having a desired wavelength band in accordance with the control signal.

6. The device according to claim 5, wherein the wavelength signal generation circuit is an arithmetic circuit which subtracts the first color wavelength band and the second color wavelength band from the wavelength signal having the all wavelength band to generate the wavelength signal having the third color wavelength band.

7. The device according to claim 5, wherein the plurality of contour signal extraction circuits include: a first contour signal extraction circuit which extracts a first contour signal from the wavelength signal having the all wavelength band generated by the sensor unit; a second contour signal extraction circuit which extracts a second contour signal from the wavelength signal having the first color wavelength band generated by the sensor unit; and a third contour signal extraction circuit which extracts a third contour signal from the wavelength signal having the second color wavelength band generated by the sensor unit, and
   the contour signal selection circuit restricts the contour signal extracted by the first contour signal extraction circuit based on the plurality of contour signals extracted by the second and third contour signal extraction circuits to output a contour signal having a desired wavelength band.

8. The device according to claim 7, wherein the signal processing circuit further includes first and second low-pass filter circuits which receive the wavelength signals having the first color wavelength band and the second color wavelength band generated by the sensor unit.

9. The device according to claim 7, wherein the contour signal selection circuit includes:
a wavelength band extraction circuit which receives the first, second and third contour signal, and extracts a plurality of desired wavelength bands by executing an arithmetic operation using the first, second and third contour signals and determination processing based on first and second predetermined reference levels;
a selector which selects one of the wavelength bands extracted by the wavelength band extraction circuit in accordance with the control signal; and
a switch circuit which receives the first contour signal, and controls whether the first contour signal is enabled or disabled based on an output signal from the selector.

10. The device according to claim 9, wherein the first reference level is higher than the second reference level.

11. The device according to claim 5, wherein the optical filters are color filters that separate the wavelength of the light into an all wavelength band, a green wavelength band, and a red wavelength band,
the sensor unit generates a wavelength signal having the green wavelength band as the wavelength signal having the first color wavelength band and generates a wavelength signal having the red wavelength band as the wavelength signal having the second color wavelength band, and
the wavelength signal generation circuit generates a wavelength signal having a blue wavelength band as the wavelength signal having the third color wavelength band.

12. The device according to claim 5, wherein the optical filters are color filters which separate the wavelength of the light into an all wavelength band, a green wavelength band, and a blue wavelength band,
the sensor unit generates a wavelength signal having a green wavelength band as the wavelength signal having the first color wavelength band and generates a wavelength signal having the blue wavelength band as the wavelength signal having the second color wavelength band, and
the wavelength signal generation circuit generates a wavelength signal having a red wavelength band as the wavelength signal having the third color wavelength band.

13. The device according to claim 5, wherein the optical filters are color filters which separate the wavelength of the light into an all wavelength band, a red wavelength band, and a blue wavelength band,
the sensor unit generates a wavelength signal having the red wavelength band as the wavelength signal having the first color wavelength band and generates a wavelength signal having the blue wavelength band as the wavelength signal having the second color wavelength band, and
the wavelength signal generation circuit generates a wavelength signal having a green wavelength band as the wavelength signal having the third color wavelength band.

14. A solid-state image pickup device comprising:
a sensor unit in which pixels formed of photoelectric transducers which convert a signal of light condensed by an optical lens which condenses light and whose focal position differs depending on a wavelength of the light into electric signals and optical filters which are arranged on front surfaces of the photoelectric transducers and separate the wavelength of the light are two-dimensionally arranged, and which separates the signal of light into 3 wavelength components having a blue wavelength band, a green wavelength band, and a red wavelength band to generate electrical wavelength signals; and
a signal processing circuit which processes the 3 wavelength signals generated by the sensor unit,
wherein the signal processing circuit includes:
first to third contour signal extraction circuits which receive the three wavelength signals having the blue wavelength band, the green wavelength band, and the red wavelength band to extract first to third contour signals;
a contour signal synthesis circuit which receives the first to third contour signals and synthesizes a contour signal of a wavelength signal having an all wavelength band to be output as a fourth contour signal; and
a contour signal selection circuit which receives a control signal, the fourth contour signal, and the first to third contour signals, and selects and outputs a contour signal having a desired wavelength band in accordance with the control signal.

15. The device according to claim 14, wherein the contour signal selection circuit restricts the fourth contour signal output from the contour signal synthesis circuit based on the first to third contour signals, and outputs the contour signal having the desired wavelength band.

16. The device according to claim 14, wherein the signal processing circuit further includes first to third low-pass filter circuits which receive the wavelength signals having the blue wavelength band, the green wavelength band, and the red wavelength band generated by the sensor unit.

17. The device according to claim 14, wherein the contour signal selection circuit includes:
a wavelength band extraction circuit which receives the first, second and third contour signal, and extracts a plurality of desired wavelength bands by executing an arithmetic operation using the first, second and third contour signals and determination processing based on a predetermined reference level;
a selector which selects one of the wavelength bands extracted by the wavelength band extraction circuit in accordance with the control signal; and
a switch circuit which receives the fourth contour signal, and controls whether the fourth contour signal is enabled or disabled based on an output signal from the selector.

* * * * *